US011228114B2

(12) United States Patent
Tan

(10) Patent No.: US 11,228,114 B2
(45) Date of Patent: Jan. 18, 2022

(54) ANTENNA ENHANCING HOLDING STRUCTURE FOR AN INTERNET-OF-THINGS (IOT) DEVICE

(71) Applicant: NETGEAR, INC., San Jose, CA (US)

(72) Inventor: Jingyuan Tan, Surrey (CA)

(73) Assignee: NETGEAR, INC., San Jose, CA (US)

( * ) Notice: Subject to any disclaimer, the term of this patent is extended or adjusted under 35 U.S.C. 154(b) by 388 days.

(21) Appl. No.: 16/184,896

(22) Filed: Nov. 8, 2018

(65) Prior Publication Data
US 2019/0379128 A1 Dec. 12, 2019

Related U.S. Application Data

(60) Provisional application No. 62/681,587, filed on Jun. 6, 2018.

(51) Int. Cl.
| | |
|---|---|
| *H01Q 1/24* | (2006.01) |
| *H01Q 19/02* | (2006.01) |
| *H01Q 9/42* | (2006.01) |
| *H04W 4/70* | (2018.01) |

(52) U.S. Cl.
CPC ............. *H01Q 19/021* (2013.01); *H01Q 9/42* (2013.01); *H04W 4/70* (2018.02)

(58) Field of Classification Search
None
See application file for complete search history.

(56) References Cited

U.S. PATENT DOCUMENTS

| | | | | |
|---|---|---|---|---|
| 9,861,080 | B1* | 1/2018 | Hathway | A01K 11/008 |
| 10,355,344 | B1* | 7/2019 | Ruaro | H04B 1/385 |
| 2011/0152725 | A1* | 6/2011 | Demir | A61B 5/103 600/587 |
| 2014/0312834 | A1* | 10/2014 | Tanabe | H01Q 1/2291 320/108 |
| 2015/0357704 | A1* | 12/2015 | Vajha | A61B 5/0031 343/718 |
| 2018/0090826 | A1* | 3/2018 | Da Costa Bras Lima | H01Q 9/04 |

* cited by examiner

*Primary Examiner* — Trinh V Dinh
(74) *Attorney, Agent, or Firm* — Perkins Coie LLP

(57) ABSTRACT

The disclosed embodiments include a monitoring system. The monitoring system includes a wireless device and a holding structure. The wireless device includes communications circuitry that enables wireless communications of data obtained locally by the wireless device, and an antenna coupled to the communications circuitry and configured to radiate signals including information indicative of the obtained data. The holding structure includes an engagement member configured to detachably engage the wireless device, an attachment member configured to detachably attach the engaged wireless device to a surface of an object monitored by the wireless device, and an antenna enhancing structure disposed inside the holding structure and configured to mitigate interference by the surface of the object on the signals radiated by the antenna.

22 Claims, 9 Drawing Sheets

ANTENNA ENHANCING HOLDING STRUCTURE FOR AN INTERNET-OF-THINGS (IOT) DEVICE

CROSS-REFERENCE TO RELATED APPLICATION

This application claims priority to U.S. provisional patent application Ser. No. 62/681,587 filed Jun. 6, 2018 and titled "Antenna Structures for Internet of Things (IoT) Devices," which is incorporated herein in its entirety by this reference thereto.

TECHNICAL FIELD

The disclosed teachings relate to an antenna enhancing structure for an Internet-of-Things (IoT) device. The disclosed teachings more particularly relate to an antenna enhancing structure incorporated in a holding structure of an IoT device that can mitigate performance signal degradation of the IoT device caused by a surface material on which the holding structure is mounted.

BACKGROUND

Modern environments include various types of electronic devices that can communicatively couple to networks. In general, electronic devices at the edge of networks can form an endpoint of a network connection. An example is an Internet-of-Things (IoT) device that can generate and/or collect data and exchange data on a network. An IoT device is usually relatively small, and battery powered. The IoT device can be connected to the network permanently or intermittently. In many cases, an IoT device may include electronics, software, sensors, and network connectivity components included in other devices, vehicles, buildings, or other objects. An IoT device may automatically and autonomously (e.g., without human intervention) perform machine-to-machine (M2M) communications directly with other electronic devices (e.g., device-to-device communication) over a network.

The term IoT generally refers to a network of mobile devices, vehicles, home appliances, and other items embedded with electronics, software, sensors, and connectivity modules that enable these items to exchange data with each other. Thus, the IoT allows for the internetworking of electronic devices to enable sophisticated functionality. For example, electronic devices configured for home automation can exchange data to allow for automation of lighting systems, air conditioning systems, and security systems. As another example, electronic devices configured for tracking the location and/or movement of objects can exchange data to permit continual monitoring of a geographic location.

Some tracking devices are configured solely to monitor geographic locations, while other tracking devices are configured to support additional functionalities (e.g., fitness or communication). Moreover, tracking devices can be designed to monitor the location of a human body (e.g., those devices made by FITBIT and APPLE), animal bodies (e.g., those devices made by WHISTLE and FIRBARK), or inanimate objects (e.g., those devices made by TILE and TRACKR). The limited capabilities of relatively small IoT devices, which affects their reliability and performance, leaves much to be desired. In some instances, IoT devices that communicate wirelessly over a network have antennas with limited range. Hence, antennas for tracking devices tend to lack stable performance, which is particularly true depending on the different types of surfaces on which the tracking devices are mounted. For example, the surface material of an animal wearing a tracking device can interfere with the performance of the antenna of a tracking device. Accordingly, there is a need for IoT monitoring devices with enhanced antenna functionality.

SUMMARY

The disclosed embodiments include a monitoring system. The monitoring system includes a wireless device and a holding structure. The wireless device includes communications circuitry that enables wireless communications of data obtained locally by the wireless device, and an antenna coupled to the communications circuitry and configured to radiate signals including information indicative of the obtained data. The holding structure includes an engagement member configured to detachably engage the wireless device, an attachment member configured to detachably attach the engaged wireless device to a surface of an object monitored by the wireless device, and an antenna enhancing structure disposed inside the holding structure and configured to mitigate interference by the surface of the object on the signals radiated by the antenna.

Other aspects of the technique will be apparent from the accompanying Figures and Detailed Description.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the figures, in which like references may indicate similar elements.

Figure 1:
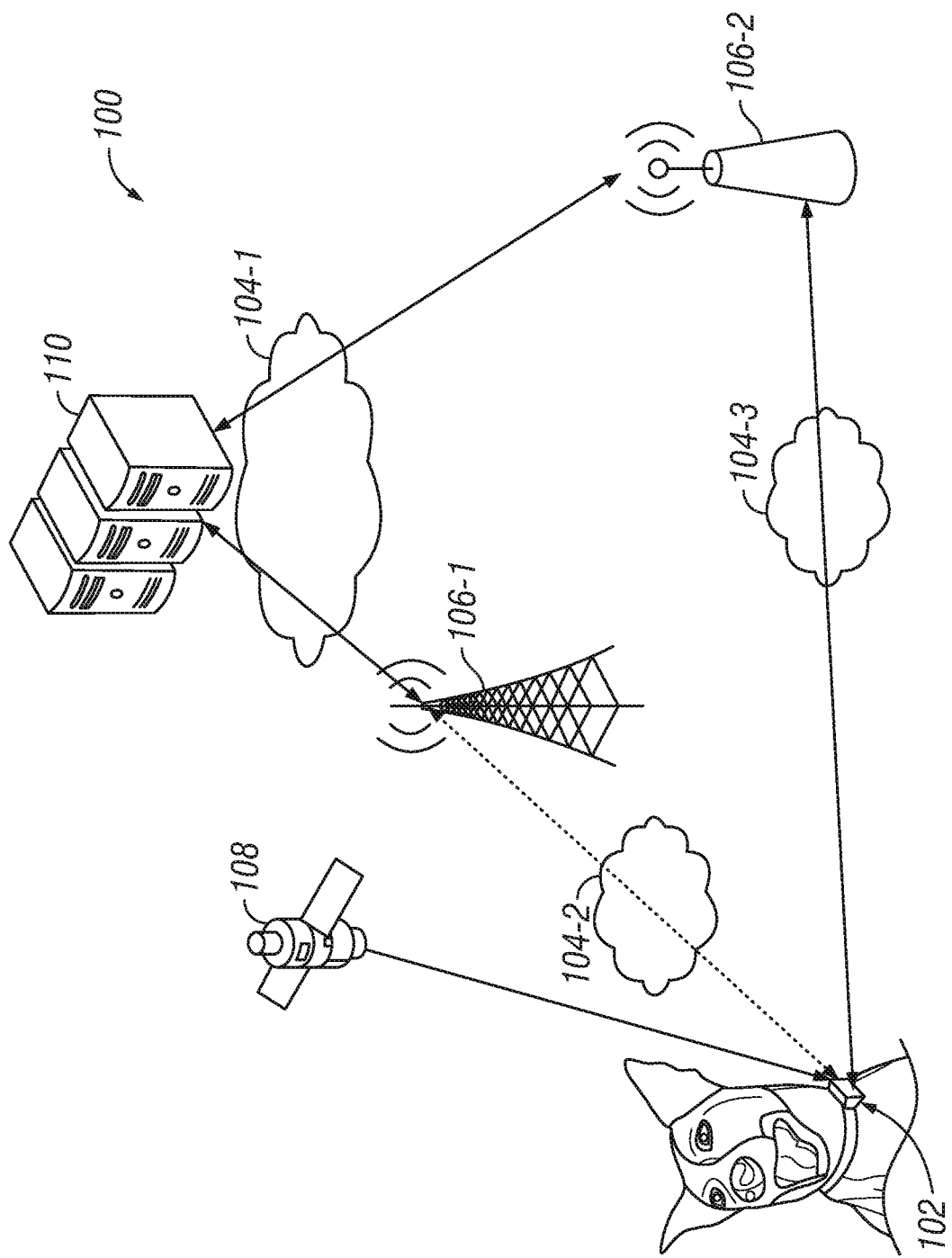
FIG. 1 is a block diagram illustrating a tracking system in which at least some aspects of the disclosed technology can be implemented.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to examine video content generated by an electronic device, identify elements included in the video content, apply a classification model to determine an appropriate action, and perform the appropriate action.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

As used herein, the term "Internet-of-Things device" (or "IoT device") may refer to any object (e.g., an appliance, a sensor) that has an addressable interface (e.g., an internet protocol (IP) address, a BLUETOOTH identifier (ID), a near-field communication (NFC) ID) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like.

An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function) that can be embedded in and/or controlled/monitored by a local or remote central processing unit (CPU), microprocessor, ASIC, or the like, and configured for connection to an IoT network such as a local ad-hoc network or the Internet.

For example, IoT devices may include, but are not limited to, tracking devices, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, and the like, which are equipped with an interface for communicating with an IoT network.

Although cell phones, desktop computers, laptop computers, tablet computers, personal digital assistants (PDAs), and the like can perform many IoT functions, IoT devices typically lack the capabilities to perform computationally intensive processes because they are relatively smaller devices that perform limited functions and have limited power sources. Hence, IoT devices typically have limited capabilities for performing analytics on data that the IoT devices generate and/or collect. Instead, the data obtained by the IoT devices are typically communicated to another device that can perform analytics on the obtained data. IoT devices can operate automatically and autonomously to obtain and communicate data, for example, according to a preset schedule or when an IoT device determines that it can communicatively couple to another device. In other words, IoT devices are often intermittently coupled to an IoT network because of the nature of IoT devices (e.g., trackers that are remote from networks) and to conserve limited power resources.

A monitoring device is an example of an IoT device. A monitoring device is part of a monitoring system that can monitor various parameters about the object that is being monitored by the monitoring device. For example, a monitoring device can monitor parameters indicative of the health status of a person and supply that health data over an IoT network to an analytics device for further processing.

A tracking device is an example of a monitoring device. A tracking device is part of a tracking system used for monitoring human or animal users, or other objects. A location-based tracking system can obtain data about the movement of objects and supply that tracking data over an IoT network to an analytics device for further processing. There are myriads of tracking systems. Some are lag-time indicators that collect data after the tracked object has passed a checkpoint. Others are real-time or near real-time tracking systems with tracking functions that use global positioning systems (GPS) coordinates to determine a current location or movement.

A tracking device has a relatively small size compared to the object being tracked, is battery-powered, and can communicate tracking data wirelessly over an IoT network. The communications capabilities of a tracking device are limited because the tracking device typically has a minimal but sufficient amount of computing and power resources that it can utilize to perform dedicated functions over an extended period.

For example, a tracking device can have one or more antenna elements that form an antenna operable to communicate tracking data wirelessly on an IoT network. Like most wireless devices, interference from other objects can degrade signals transmitted by tracking devices. This problem is further exacerbated in tracking devices that are mounted to objects. For example, tracking devices typically utilize long wavelength, low radio frequencies (RF) that exhibit low signal attenuation, which makes them suitable for long-distance communications. An antenna of a tracking device can experience unreliable or ineffective performance because they operate in low frequency bands (e.g., those less than 1 GHz) that experience interference from the objects that they track. Specifically, a tracking device is mounted on the surface of an object that is being tracked by the tracking device (e.g., when being work by a human user). The surface material of the object can interfere with the performance of the nearby antenna.

Introduced here are technologies for improving the performance of antennas in low frequency bands. In one embodiment, a holding structure can engage a tracking device to enable securing the tracking device to the object being tracked. The holding structure is made of a material that is compatible with the surface material of the object being tracked. For example, a holding structure of a wearable device for a human user is made of a biocompatible material. To mitigate the effects on the antenna caused by the surface material of the object being tracked, an antenna enhancing structure is embedded in the holding device. For example, the antenna enhancing structure may be a flat metal sheet disposed inside the holding structure. As described below, one or more characteristics (e.g., position, size, shape, and material) of the antenna enhancing structure are such that the holding structure improves the reliability of the performance of the antennas. For example, a flat metal sheet embedded in the holding structure can isolate the antenna of the tracking device from the surface material of the objected being tracked to improve the effectiveness of the antenna.

FIG. 1 is a block diagram illustrating a tracking system in which at least some aspects of the disclosed technology can be implemented. As shown, the tracking system 100 includes components such as a tracking device 102 engaged by a holding structure of a collar worn by a dog. The tracking device 102 can communicatively couple to other electronic devices over one or more networks 104. The tracking device 102 can access the network(s) via network access nodes 106-1 and 106-2 (collectively "network access nodes 106").

The tracking device 102 can estimate its geographic location and related movement by, for example, utilizing satellites 108 of a global positioning system (GPS) that transmits GPS positioning signals received by the tracking device 102. The tracking device 102 can process the received GPS positioning signals to estimate the location of the dog wearing the tracking device 102 according to various techniques known to persons skilled in the art. As such, the location data generated by the tracking device 102 can be communicated over the networks 104 via the network access nodes 106 to another electronic device. Note, however, that the embodiments are not limited to using GPS signals to estimate a geographic location or movement of the tracking device 102. Instead, any method known, being developed, or not yet developed may be used by the tracking device 102 to estimate its geographic location.

The tracking device 102 represents any wireless IoT device with limited capabilities or, more broadly, represents an electronic device that can utilize the network access nodes 106 to access the network(s) 104 for wirelessly communicating data obtained (e.g., generated) locally by the tracking device 102. An example of an alternative to the tracking device 102 is a wearable device for a human user, or any machine-to-machine device that can automatically and autonomously obtain data of an environmental condition and execute an action on the obtained data. An executed action includes communicating the obtained data over the network(s) 104 when the tracking device is able to establish a connection with the network(s) 104.

The tracking device 102 is enabled to access any of the network(s) 104 by using the communications circuitry and the antennas of the tracking device 102. In some embodiments, the tracking device 102 can store and/or transmit tracking data in a variety of forms including raw data or minimally processed data, semi-structured data, or structured data obtained by processing raw data generated by, for example, a sensor of the tracking device 102. In some embodiments, the tracking device 102 can be configured (or reconfigured) remotely by the network-accessible server system 110. For example, the antenna elements of the tracking device 102 can be separately and/or collectively addressable to optimize access to the networks 104. In other example, the network-accessible server system 110 can remotely schedule the tracking device 102 to send tracking data.

The network access nodes 106 include any type of radio network nodes that can communicate with a wireless electronic device (e.g., tracking device 102) and/or with another network node. In some embodiments, the network access nodes 106 may be a network device or apparatus. Examples of network access nodes include a base station (e.g., network access node 106-1), an access point (e.g., network access node 106-2), or any other type of network node such as a controller, relay, transmission point, and the like.

The tracking system 100 illustrates different types of network access nodes 106 to show that the tracking device 102 may access different types of networks through different types of network access nodes. For example, the network access node 106-1 (e.g., a base station) can provide access to a cellular network of the network(s) 104. In contrast, the network access node 106-2 (e.g., access point) can provide access to a computer network of the network(s) 104.

The network(s) 104 may include any combination of private, public, wired, or wireless systems such as a cellular telephone network, a computer network, the Internet, or the like. Any data communicated over the network(s) 104 may be encrypted or unencrypted at various locations or along different portions of the network(s) 104. Examples of wireless systems include Wideband Code Division Multiple Access (WCDMA), High Speed Packet Access (HSPA), WiMax, Wi-Fi, Wireless Local Area Network (WLAN), and Global System for Mobile Communications (GSM), GSM Enhanced Data Rates for Global Evolution (EDGE) Radio Access Network (GERAN), and other networks.

The tracking system 100 may use a variety of communications standards, protocols, number of frequency bands, frequencies, and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), 3rd Generation Partnership Project (3GPP) related standards, BLUETOOTH, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed.

The network-accessible server system 110 of the tracking system 100 can receive tracking data over the network(s) 104 obtained by the tracking device 102. The network-accessible server system 110 may include any number of server computers that can communicatively couple to the tracking device 102 via the network access nodes 106. As such, the network-accessible server system 110 may include combinations of hardware and/or software to process tracking data, perform functions, communicate over the network(s) 104, and the like. For example, server computers of the network-accessible server system 110 may include a processor, memory or storage, a transceiver, a display, operating system, and application software. Other components, hardware, and/or software of the tracking system 100 that are well known to persons skilled in the art are not shown or discussed herein for brevity.

The network-accessible server system 110 can be located anywhere in the tracking system 100 to receive tracking data from the tracking device 102 and transmit control data to the tracking device 102. The network-accessible server system 110 may include resources or analytics tools for analyzing the tracking data communicated by the tracking device 102. In some instances, the network-accessible server system 110 can remotely configure (or reconfigure) the tracking device 102. The network-accessible server system 110 can also manage resources used to maintain network access by the tracking device 102. Examples of the resources include protocols, frequencies, settings, services, software, and the like.

Tracking Device Overview

Figure 2A:
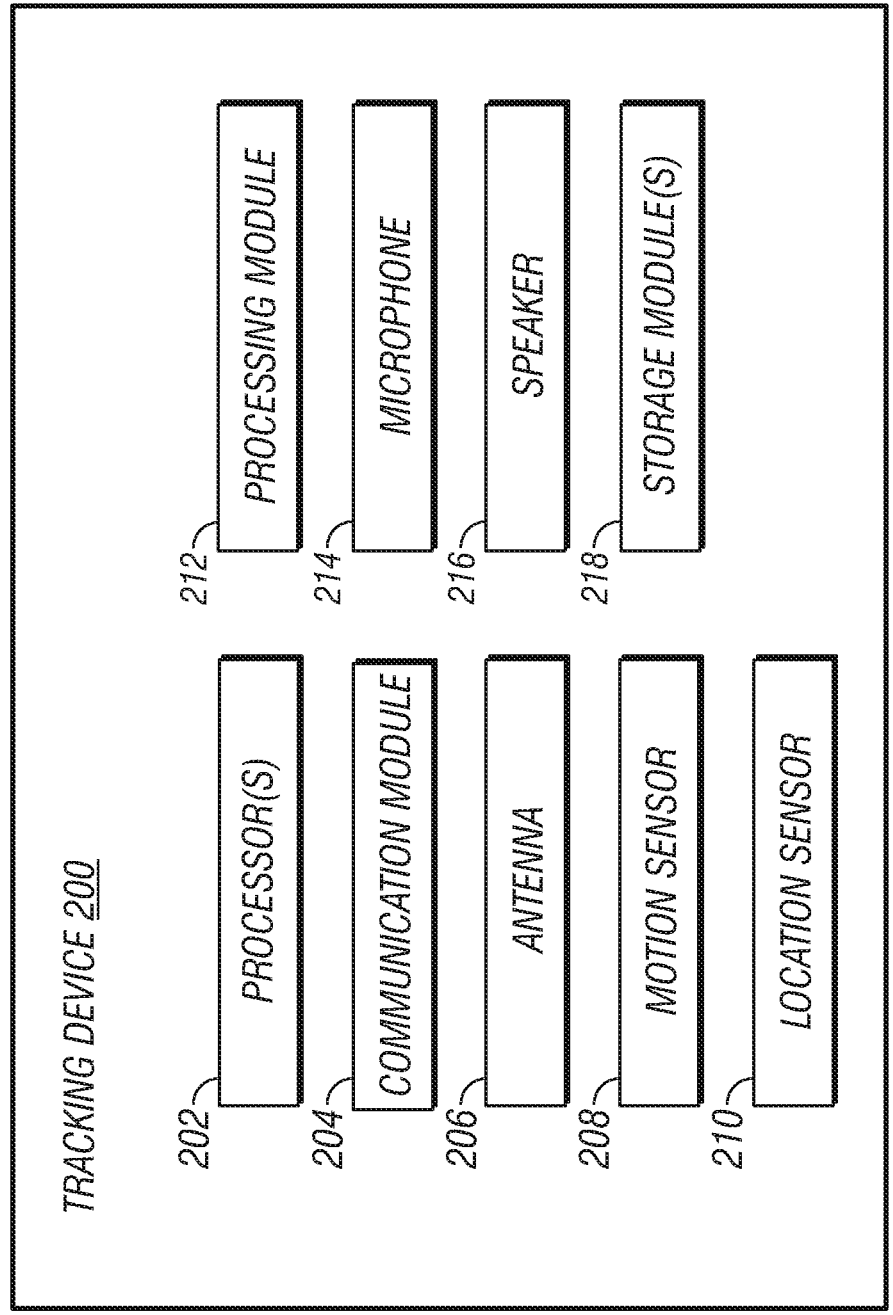
FIG. 2A is a high-level functional block diagram illustrating the architecture of a tracking device that can monitor the geographical location and related movement of an object being monitored according to some embodiments of the present disclosure.

FIG. 2A is a high-level functional block diagram illustrating the architecture of a tracking device 200 (e.g., tracking device 102) that can monitor the geographical location and related movement of an object being monitored. As noted above, the object may be a human body, an animal body, or an inanimate object (e.g., cargo container). While embodiments may be described in the context of, for example, tracking devices for monitoring the location and/or movement of animal bodies (e.g., cats, dogs), those skilled in the art will recognize that similar technologies may be used for monitoring the location and/or movement of human bodies or inanimate objects. As further described below, the tracking device 200 may generate tracking data while monitoring the location/movement of an object, and then transmit the tracking data to a base device (e.g., network-accessible server system 110) for further review.

The tracking device 200 can include one or more processors 202, a communication module 204, an antenna 206, a motion sensor 208, a location sensor 210, a processing module 212, a microphone 214, a speaker 216, and one or more storage modules 218. The processor(s) 202 can execute instructions stored in the storage module(s) 218, which can be any device or mechanism capable of storing information. In some embodiments a single storage module includes multiple computer programs for performing different operations (e.g., filtering motion data, identifying movements, determining location), while in other embodiments each computer program is hosted within a separate storage module.

The communication module 204 can manage communication between various components of the tracking device 200. The communication module 204 can also manage communications between the tracking device 200 and another electronic device such as a base device. For example, the communication module 204 may facilitate communication with a mobile phone, tablet computer, wireless access point (WAP), etc. In another example, the communication module 204 may facilitate indirect communication with a network-connected computer server (e.g., via a base device responsible for relaying communications between the tracking device 200 and the base device) or direct communication with the network-connected computer server.

Generally, the communication module 204 communicates with other electronic device(s) by transmitting data via the antenna 206. For example, the communication module 204 may include communications circuitry to forward tracking data generated by the motion sensor 208 and/or the location sensor 210 to the antenna 206 for transmission to a base device for further review. The base device may examine the tracking data itself or transmit the data to a network-connected computer server for examination. As further described below, the antenna 206 may be designed to improve sensitivity/transmission capabilities in the lower frequency bands often used by IoT devices.

The motion sensor 208 (e.g., an inertial sensor, or inertial measurement unit) can be configured to generate motion data related to movement of the tracking device 200. Examples of motion sensors include accelerometers, and gyroscopes. In some embodiments, the motion sensor 208 is configured to continually generate data indicative of movement of the tracking device 200 responsive to, for example, determining that a certain amount of movement has occurred.

The location sensor 210 can be configured to generate location data related to geographical location of the tracking device 200. One example of a location sensor is a global positioning system (GPS) module. In some embodiments, the location sensor 210 generates geolocation information that includes location coordinates. In other embodiments, the location sensor 210 generates geolocation information that includes identifiers for objects located at known locations. For example, the geolocation information may identify WAPs to which the tracking device 200 has been communicatively connected, and the location of the tracking device 200 can be inferred based on the location of the WAPs.

The processing module 212 can be configured to examine motion data generated by the motion sensor 208 to determine what movement, if any, has occurred. Similarly, the processing module 212 can be configured to examine location data generated by the location sensor 210 to determine the location of the tracking device at any given point in time. The processing module 212 may also consider data generated by other components (e.g., the microphone 214) as input.

The microphone 214 can be configured to record sounds within the ambient environment. The tracking device 200 may include multiple microphones. In such embodiments, the microphones may be omnidirectional microphones designed to pick up sound from all directions. Alternatively, the microphones may be directional microphones designed to pick up sounds coming from a specific direction. For example, if the tracking device 200 is intended to be mounted in a certain orientation (e.g., such that the motion sensor 208 is disposed parallel to an outer surface of a body on which the tracking device 200 is affixed), then the tracking device may include at least one microphone arranged to pick up sounds originating from a focal point.

The speaker 216, meanwhile, can be configured to convert an electrical audio signal into a corresponding sound that is projected into the ambient environment. Together with the microphone 214, the speaker 216 enables an individual located within the ambient environment to converse with another individual located outside of the ambient environment. Similarly, an individual located outside of the ambient environment could communicate with an animal on which the tracking device 200 is affixed.

Embodiments of the tracking device 200 may include some or all of these components, as well as other components not shown or described herein. For example, if the tracking device 200 is designed to be affixed to an animal, then some components (e.g., the microphone 214 and the speaker 216) may not be included.

Figure 2B:
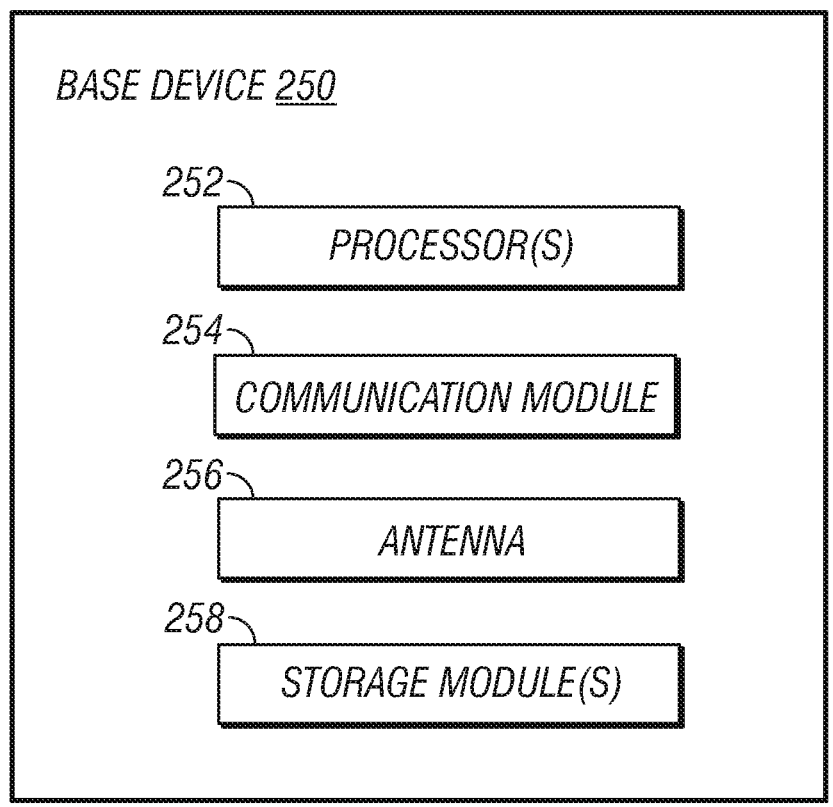
FIG. 2B is a high-level functional block diagram illustrating a base device configured to process and forward tracking data generated by a tracking device according to some embodiments of the present disclosure.

FIG. 2B is a high-level functional block diagram illustrating a base device 250 configured to process tracking data generated by a tracking device (e.g., tracking device 200 of FIG. 2A), and forward the processed tracking data to a network-connected computer server.

The base device 250 can include one or more processors 252, a communication module 254, an antenna 256, and one or more storage modules 258. In some embodiments a single storage module includes multiple computer programs for performing different operations (e.g., filtering motion data, identifying movements, determining location), while in other embodiments each computer program is hosted within a separate storage module. Moreover, the base device 250 may include a separate storage module for different tracking devices, different types of tracking device, etc.

Such a categorization enables the base device 250 to readily identify the data (e.g., motion data or location data) generated by each tracking device to which it is communicatively connected. Different types of data may be treated differently by the base device 250. For example, the base device 250 may locally examine location data that may convey sensitive information about the location of the subject being tracked but transmit less sensitive data (e.g., movement data) to a network-connected computer server for examination.

Thus, in some embodiments the base device 250 examines tracking data generated by a tracking device (e.g., tracking device 200) to better understand what movements have been performed by the tracking device, where the tracking device has been located, etc. In other embodiments, the base device 250 transmits the data to a network-connected computer server responsible for performing such analysis.

The communication module 254 includes communications circuitry to manage communication with tracking device(s) and/or the network-connected computer server. In some embodiments, different communication modules handle these communications. For example, the base device 250 may include one communication module for communicating with the tracking device(s) via a short-range communication protocol, such as BLUETOOTH or near field communication (NFC), and another communication module for communicating with the network-connected computer server via a cellular network or the Internet. In some embodiments, the communication module 254 is configured to forward data to an antenna 256 for transmission to a tracking device or the network-connected computer server. Similarly, the communication module 254 may be configured to receive data from the tracking device or the network-connected computer server at the antenna 256.

Figures 3A, 3B:
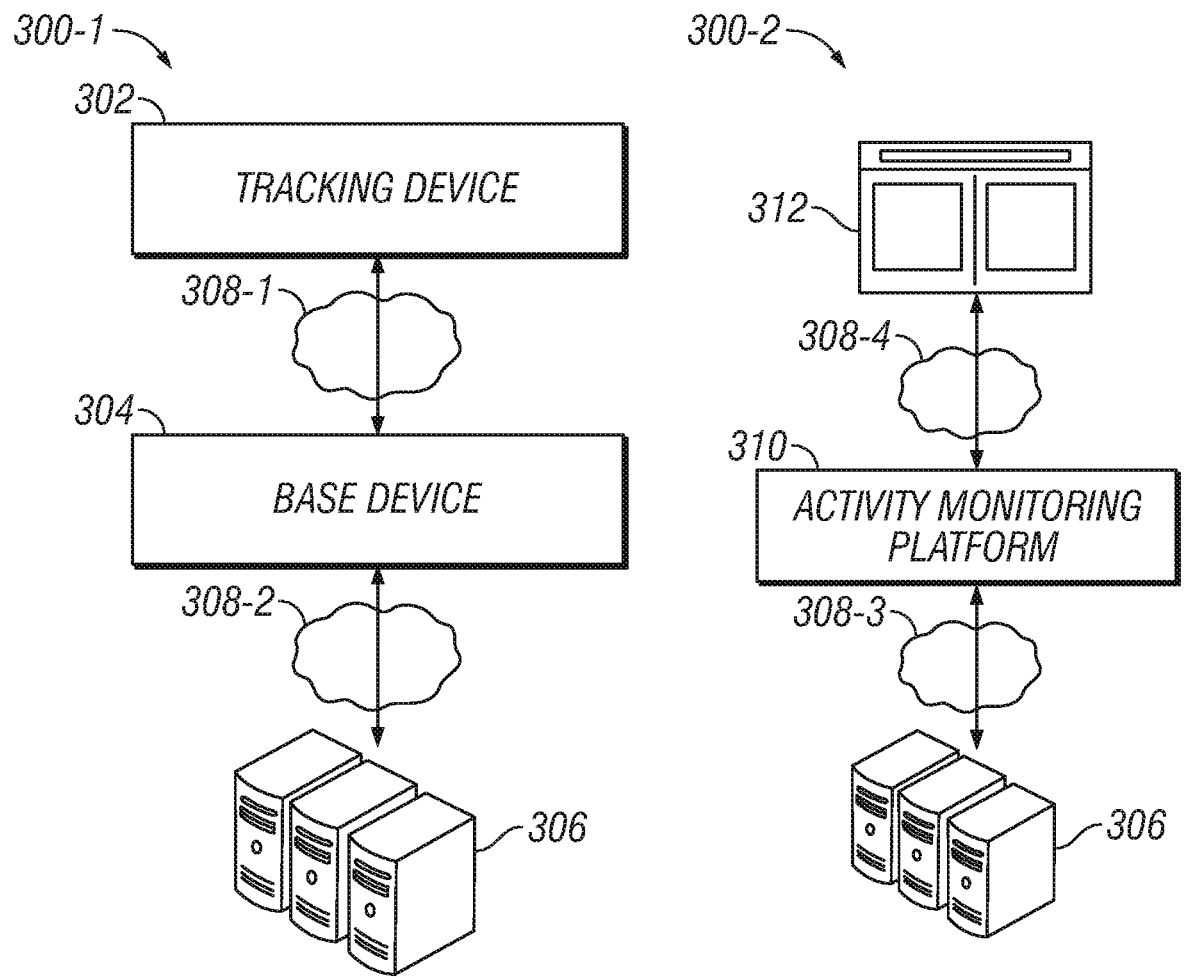
FIG. 3A illustrates a network environment that includes a tracking device configured to generate data indicative of the position and/or movement of an object to which the tracking device is affixed according to some embodiments of the present disclosure.
FIG. 3B illustrates a network environment that includes an activity monitoring platform supported by a network-accessible server system according to some embodiments of the present disclosure.

FIG. 3A illustrates a network environment 300-1 that includes a tracking device 302 configured to generate data indicative of the position and/or movement of an object to which the tracking device 302 is affixed. In some embodiments, the tracking device 302 transmits tracking data to a base device 304, which then forwards at least some of the data to a network-accessible server system 306. In other embodiments, the tracking device 302 transmits the data directly to the network-accessible server system 306.

The tracking device 302, base device 304, and network-accessible server system 306 can be connected to one another via one or more networks 308-1 and 308-2. Examples of networks include personal area networks (PANs), local area networks (LANs), wide area networks (WANs), metropolitan area networks (MANs), cellular networks, and the Internet. Additionally, or alternatively, the tracking device 302, base device 304, and network-accessible server system 306 can be connected to one another via a short-range communication protocol, such as BLUETOOTH or NFC. For example, the tracking device 302 may be communicatively connected to the base device 304 via a BLUETOOTH communication channel, and the base device 304 can be communicatively connected to the network-accessible server system 306 via the Internet.

FIG. 3B illustrates a network environment 300-2 that includes an activity monitoring platform 310 that is supported by the network-accessible server system 306. Individuals can interface with the activity monitoring platform 310 via an interface 312. For example, a pet owner may examine data generated by a tracking device affixed to their dog via the interface 312.

The activity monitoring platform 310 may be responsible for parsing tracking data generated by a tracking device (e.g., tracking device 302) to detect activities performed by the object to which the tracking device is affixed. For example, the activity monitoring platform 310 may determine which activities have been performed based on the two-dimensional (2D) or three-dimensional (3D) movement(s) of the object. The activity monitoring platform 310 may also examine the data generated by the tracking device to establish the location of the object being monitored. The activity monitoring platform 310 may also be responsible for creating interface(s) through which an individual can view content (e.g., maps indicating the location of the object, charts indicating activities performed by the object), manage preferences, etc.

As noted above, the activity monitoring platform 310 may reside in a network environment 300-2. Thus, the activity monitoring platform 310 may be connected to one or more networks 308-3 and 308-4. Similar to networks 308-1 and 308-2, networks 308-3 and 308-4 can include PANs, LANs, WANs, MANs, cellular networks, the Internet, etc. Additionally, or alternatively, the activity monitoring platform 310 can be communicatively coupled to electronic device(s) over a short-range communication protocol, such as BLUETOOTH or NFC. In some embodiments, the activity monitoring platform 310 resides on a base device (e.g., base device 304) in the form of a computer program. For example, if the base device is a mobile phone, then aspects of the activity monitoring platform 310 may be embodied as a mobile application.

The interface 312 is preferably accessible via a web browser, desktop application, mobile application, or over-the-top (OTT) application. Accordingly, the interface 312 may be viewed on a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Antenna Structures for IoT Devices

Wireless IoT devices can be specifically designed for internetworking with other electronic devices. This configuration enables complex functionality by distributing or off-loading work to other devices. For example, an IoT device can be functionally dedicated to collecting data and performing minimal processing of that data before communicating the pre-processed data to a remote electronic device that performs additional processing on the pre-processed data to obtain meaningful insights.

Inside of an IoT device, the two components that typically occupy most of the space are the battery and the printed circuit board (PCB) assembly, which includes communications circuitry. In some conventional IoT devices, the battery is disposed directly adjacent to the PCB given the limited space of the IoT devices. The IoT devices, and other functionally similar wireless devices, have antenna structures coupled to the communications circuitry to enable wireless communication to occur with other wireless devices over a network. That is, the antenna elements are electrically connected to the communications circuitry of the PCB.

The antenna of an IoT device can be designed to improve sensitivity and transmission capabilities of the IoT device, particularly in lower frequency bands (e.g., less than 1 GHz) that are often used for communications by IoT devices. Given the limited space inside an IoT device and the need for reliably propagating signals long distances, the antenna is typically formed of one or more interconnected electrically conductive elements integrated in the walls of the IoT device's housing. For example, an antenna of an IoT device may comprise an arrangement of metal elements having dimensions and forming a pattern that improves transmission. The length and/or thickness of an antenna element can vary to optimize function and to create a pleasing aesthetic appearance, if visible from the exterior of the tracking device.

When designing antenna structures, several factors are considered. For example, the combination of operating frequency versus bandwidth is often a constraint that is considered. Network operators (e.g., TELSTRA, AT&T, VERIZON) have predetermined bands that are associated with certain communication protocols. For example, long-term evolution (LTE) offers a series of low frequency bands that are often used by IoT devices. Although these bands may be at low frequencies, the bands may have a wide bandwidth to cover all possible channels. For example, a channel may extend all the way down to 600 megahertz (MHz) with a specified bandwidth to cover four different radio frequency (RF) bands. The bandwidth is typically designed so that the center frequency can achieve these low frequency values and the total range covers all channels of interest. However, many antenna structures struggle to maintain high quality performance at the low frequency bands utilized by IoT devices.

IoT Device Holding Structure

Figure 4:
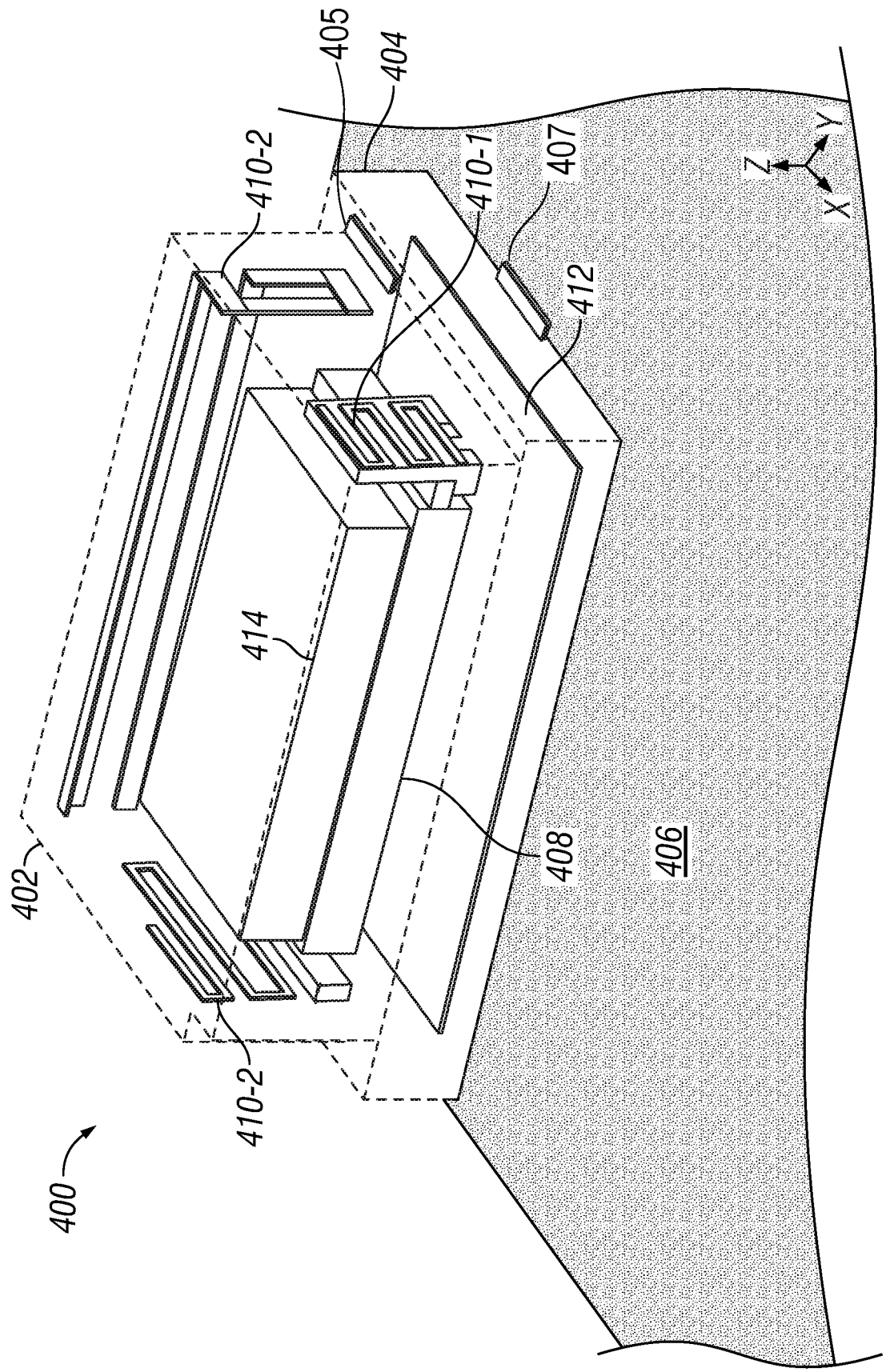
FIG. 4 illustrates a semi-transparent view of a system including a wireless device securely engaged to a holding structure, which is mounted on a surface of an object according to some embodiments of the present disclosure.

FIG. 4 illustrates a semi-transparent view of a system 400 including a wireless device 402 detachably engaged to a holding structure 404, which is mounted on a surface 406 of an object. As described elsewhere in this disclosure, the wireless device 402 is an IoT electronic device with limited and/or dedicated capabilities. For example, the wireless device 402 may be a tracking device engaged by the holding structure 404 of a collar detachably attached to a dog neck as shown in FIG. 1. For example, the wireless device 402 may securely engage with the holding structure 404 with latches, fasteners, or other known engagement members 405 that allow the wireless device 402 to detach from the holding structure 404. In some embodiments, the wireless device 402 is permanently affixed to the holding structure 404 by, for example, a permanent adhesive. Moreover, the holding device 404 includes detachable attachment members 407 to secure the holding device 404 to an object. Examples of the attachment members 407 include a fastener or clip.

The wireless device 402 houses a PCB 408 including hardware and storing software that enables data collection from, for example, a local sensor that produces data about the object and including communications circuitry coupled to antenna structures 410 for transmitting collected data to a remote electronic device. As shown, the antenna structures 410 are discrete structures embedded in the walls of the wireless device 402's housing for communicating low frequency RF signals. The wireless device 402 also houses a battery 414 or other power source for powering the PCB 408 and other related electronics of the wireless device 402. The PCB 408 and battery 414 are illustrated in FIG. 4 as blocks for brevity.

The surface 406 of the object may be, for example, the surface of living tissue of a person, the skin/hair of an animal, or the surface of the body of a vehicle. Put simply, the surfaces of some objects are composed of materials that could affect signals radiated by the antenna structures 410 of the wireless device 402. For example, a human user that contacts the antenna structures 410 could improve reception due to the conductive nature of the human body or have the opposite effect, for the same reason.

A person skilled in the art would understand that the human body causes certain effects (e.g., attenuation, scattering, reflection) on various parameters of RF signals carrying information. For example, a human body can attenuate an RF signal transmitted by a tracking device radio, which results in a noisy signal because of a decreased signal-to-noise ratio. Accordingly, wearing the wireless device 402, which would be in contact with a human user's skin, could reduce the effectiveness of the antenna structures 410. The surfaces of other types of objects (e.g., cargo containers) that are tracked by a tracking device can similarly affect wireless communications due to other physical properties known to persons skilled in the art.

The holding structure 404 engages the wireless device 402 to facilitate securing the wireless device 402 to the surface 406 of the object being monitored by the wireless device 402. The holding structure 404 is composed of a material that is compatible with the material of the surface 406 on which the holding structure 404 is mounted and secured. For example, the holding structure 404 may be composed of a biocompatible material that engages a health monitoring device as a wearable device for a human user. In some embodiments, the holding structure 404 is composed of a rigid or flexible non-conductive material such as a polymer or a ceramic material.

The RF signals radiated by the antenna structures 410 can penetrate the holding structure 404. As such, a holding structure that allows RF signals to travel through it would result in the underlying surface 406 interfering with the function of the antenna structures 410 of the wireless device 402. Specifically, the antenna structures 410 would experience degraded performance because they operate in low frequency bands that would experience interference from the surface 406 on which the wireless device 402 is mounted via the holding structure 404.

To overcome these drawbacks, the disclosed embodiments include an antenna enhancing structure 412 embedded in the holding structure 404 that improves the reliability and performance of the antenna structures 410. In some embodiments, the antenna enhancing structure 412 can isolate RF waves radiated by the antenna structures 410 from the surface 406 that would otherwise interfere with RF waves. As shown, the antenna enhancing structure 412 is a flat sheet embedded in the holding structure 404. Hence, the antenna enhancing structure 412 is positioned in the holding structure 404 between the wireless device 402 and the surface 406 when the wireless device 402 is mounted on the holding structure 404, which is mounted on the surface 406. Such an arrangement can ensure that the antenna enhancing structure 412 prevents the surface 406 from interfering with operations of the wireless device 402 performed by, for example, the antenna structures 410. In short, embedding the antenna enhancing structure 412 in the holding structure 404 allows the wireless device 402 to achieve stable antenna performance, regardless of what type of surface the holding structure 404 is mounted on.

Figure 5:
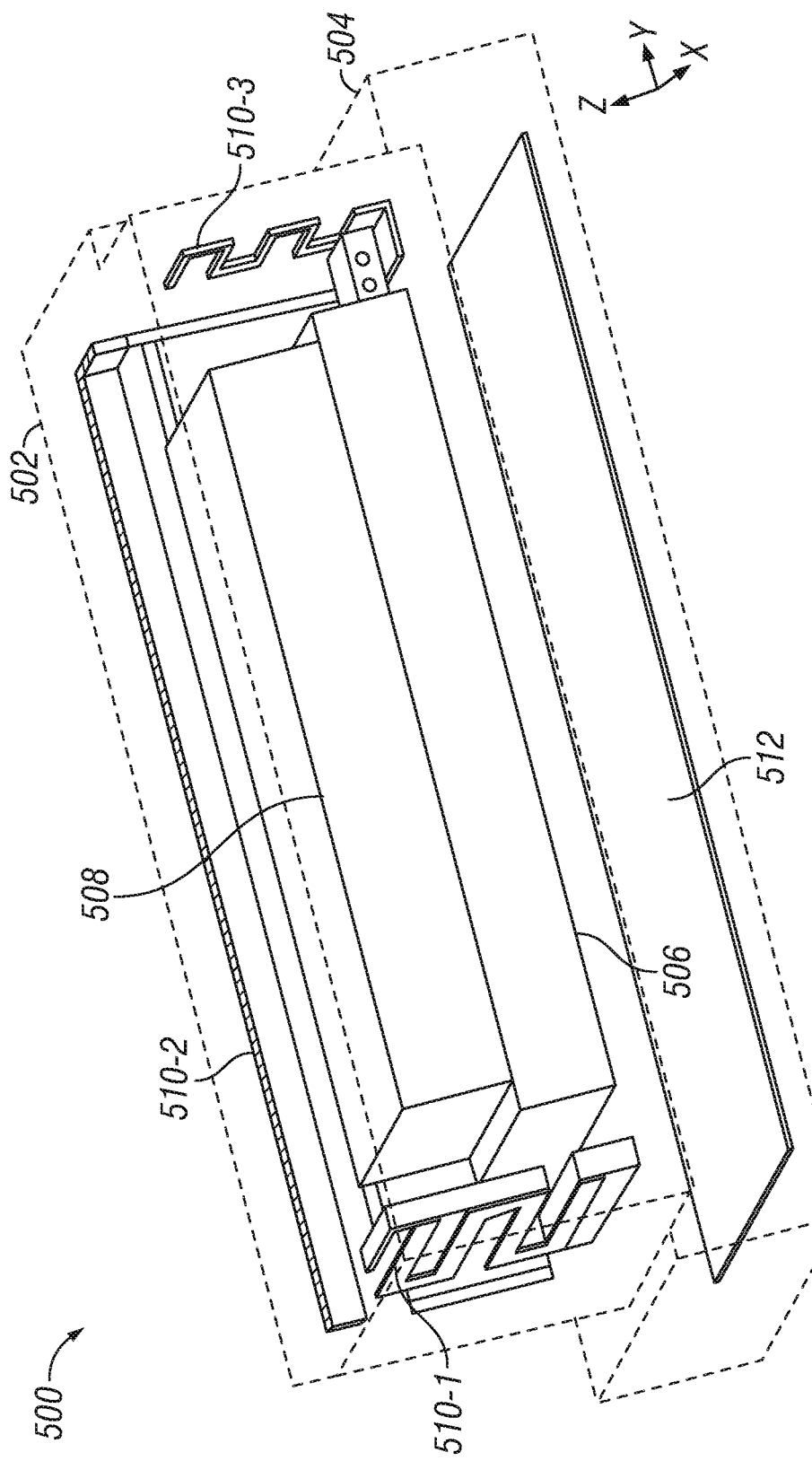
FIG. 5 illustrates a semi-transparent view of a system including a wireless device mounted on a holding device according to some embodiments of the present disclosure.

FIG. 5 illustrates a semi-transparent view of a system 500 including a wireless device 502 (e.g., wireless device 402) mounted on a holding structure 504 (e.g., holding structure 404). The wireless device 502 includes a PCB 506 with communications circuitry and other electronic components to process, store, and communicate data wirelessly to another device. The wireless device also includes a power source 508 (e.g., battery) that can power the electronic components of the wireless device 502. The PCB 506 and battery 508 are illustrated in FIG. 5 as blocks for brevity.

The antenna structures 510 are embedded in the walls of the wireless device 502 and are communicatively coupled to the communications circuitry of the PCB 506. An antenna enhancing structure 512 is embedded in the holding structure 504, which could be made of a rigid or flexible plastic or another non-electrically conductive material that is compatible with any surface on which the system 500 is designed to be mounted on.

The antenna enhancing structure 512 is disposed entirely within the holding structure 504 to enhance the operations of the antenna structures 510 by mitigating interference from a surface material on which the holding structure 504 is mounted, on the opposite side facing the wireless device 502. As shown, the antenna enhancing structure 512 is a flat sheet of material (e.g., metal or another conductive material). Given that the antenna enhancing structure 512 is disposed entirely within the holding structure 504, the antenna enhancing structure 512 can be made of a material different than the material of the holding structure 504. For example, the holding structure 504 is made of a material that is compatible with the material of the surface on which the holding structure 504 is mounted. In contrast, the antenna enhancing structure 512 could be made of a material that is incompatible with the surface material on which the holding structure 504 is mounted but which is operable to enhance the function of the antenna structures 510. As such, the holding structure 504 can beneficially enhance operations of the wireless device 502 while being mounted on virtually any surface material.

The antenna enhancing structure 512 is a flat sheet oriented on a plane perpendicular to a side of the wireless device 502 and perpendicular to some of the antenna structures 510 to mitigate the effects of interference from the surface material on the other side of the antenna enhancing structure 512. When mounted on the holding structure 504, the antenna enhancing structure 512 is positioned at a distance from the wireless device 502 to provide the described beneficial effects. The holding structure 504 may be manufactured with the antenna enhancing structure 512 positioned at any distance relative to the outermost surfaces or edges of the holding structure 504 (e.g., closer to the top or bottom surfaces), and may be adjustable later by a user, to optimize for the enhancing effects of the holding structure 504.

The antenna enhancing structure 512 may be composed of a single type of material, a combination of materials, have a solid surface area, or be formed of a pattern of conductive elements that enable electromagnetic (EM) shielding for a selected frequency range. That is, the pattern formed by the pattern of conductive elements can define a selected frequency range shielded by the conductive elements. The antenna enhancing structure 512 can be designed to enhance the function of the antenna structures 510 in a variety of other ways.

In some embodiments, the antenna enhancing structure 512 can electrically couple to electrical components of the wireless device 502 when the wireless device 502 is mounted on the holding structure 504. The electrical coupling occurs via a coupling mechanism (not shown) that establishes an electrical connection between electrical components of the wireless device 502 and the antenna enhancing structure 512. As such, the antenna enhancing structure 512 can act as an antenna element structure that augments or replaces any of the antenna structures 510 of the wireless device 502. In some instances, the antenna enhancing structure 512 can be linked to the ground plane of the PCB 506 via a coupling mechanism, to create a larger ground plane than just that of the PCB ground.

In some embodiments, the holding structure 504 only includes the antenna enhancing structure 512 to maintain a lower overall weight and reduce production costs. In other embodiments, the holding structure 504 includes other components that augment the functionality of the wireless device 502. For example, the holding structure 504 could include a supplemental power source for the wireless device 502. In another example, the power source 508 could power electronic components of the holding structure 504 to augment the overall functionality of the system 500. For example, the holding structure 504 may include LED lights powered by the power source 508 of the wireless device 502 to present notifications to the user wearing the system 500. Therefore, the various configurations of the holding structure 504 could extend antenna operations of IoT devices in a variety of ways.

Figure 6:
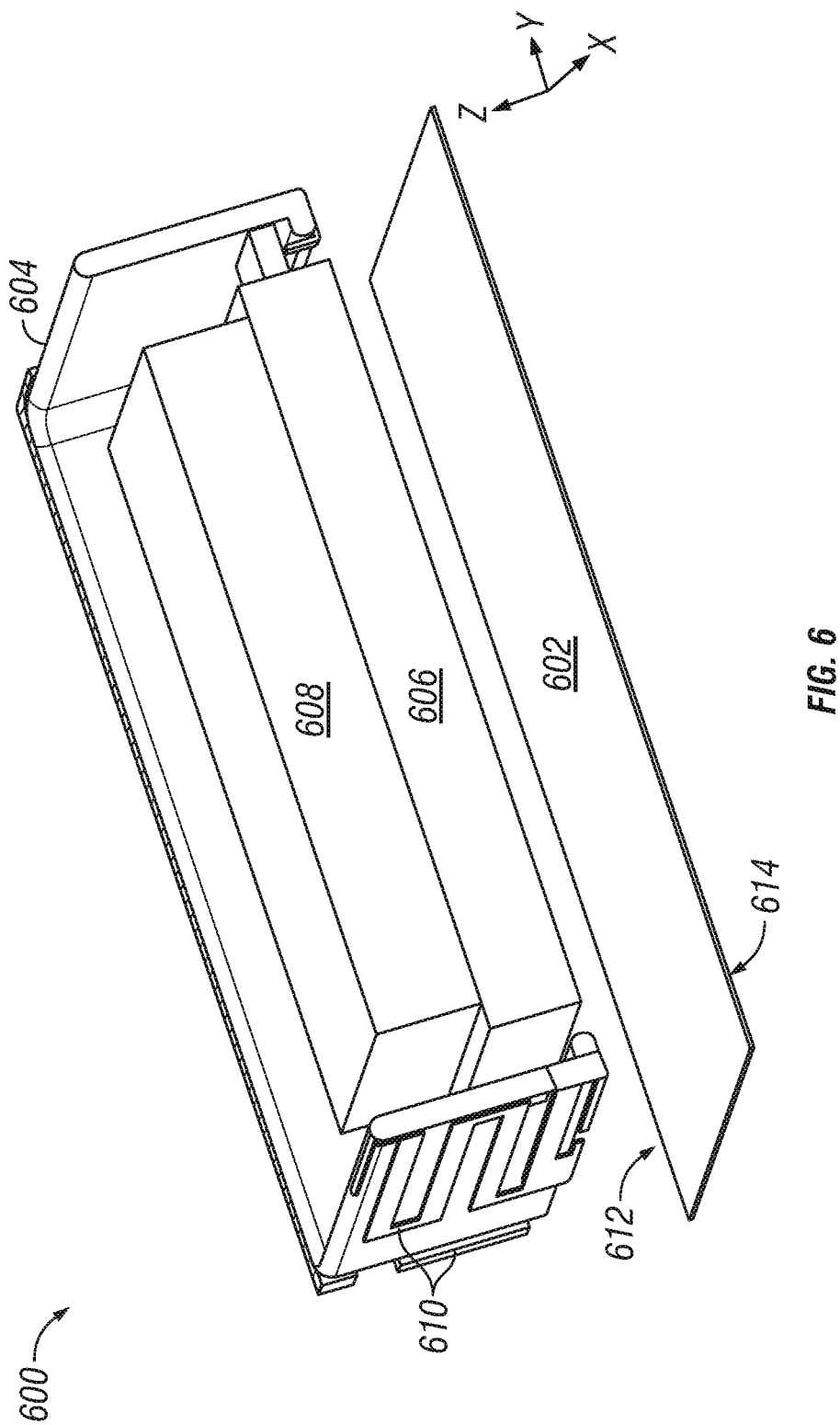
FIG. 6 illustrates a cross-section of a wireless device positioned relative to an antenna enhancing structure according to some embodiments of the present disclosure.

FIG. 6 illustrates a cross-section of a wireless device 600 (e.g., wireless devices 402 or 502) positioned relative to an antenna enhancing structure 602 (e.g., antenna enhancing structures 412 or 512). As shown, the wireless device 600 has a housing 604 that contains components such as a PCB 606 (e.g., including communications circuitry) and a power source 608 depicted as blocks for brevity. The antenna structures 610 are integrated in the walls of the housing 604 and electrically coupled to the communications circuitry of the PCB 606.

The antenna enhancing structure 602 is depicted at a selected distance and orientation relative to the wireless device 600 to, for example, shield the wireless device 600 on a first side 612 of the antenna enhancing structure 602 from material on a second side 614, opposite of the wireless device 600. The antenna enhancing structure 602 is dimensioned as a flat, rectangular conductive sheet having a surface area on the first side 612 that is equal to or greater than the underside area of the wireless device 600 facing the first side 612 when mounted on the holding structure (not shown). As such, the entire underside of the wireless device 600 can be shielded from interference caused by material facing the second side 614, depending on the dimensions of the antenna enhancing structure 602 and its distance from the wireless device 600. Accordingly, the antenna enhancing structure 602 is disposed underneath the wireless device 600 so that the antenna structures 610 that are integrated in the housing 604's walls can be isolated from a surface material underneath the antenna enhancing structure 602.

The disclosed embodiments of the antenna enhancing structure 602 is not limited in shape, dimensions, or material composition described herein. Instead, for example, the antenna enhancing structure 602 could have a variety of shapes and sizes to enhance the operations of the wireless device 600. In some embodiments, the size of an antenna enhancing structure is sufficiently large to ensure that antenna performance is not negatively affected. Thus, the antenna enhancing structure 602 may have similar dimensions as the housing 604 of the wireless device 600. Here, the antenna enhancing structure 602 is approximately 47 mm by 39 mm. Again, however, the dimensions of the antenna enhancing structure 602 can (and often will) vary based on the size of the wireless device 600.

Figure 7:
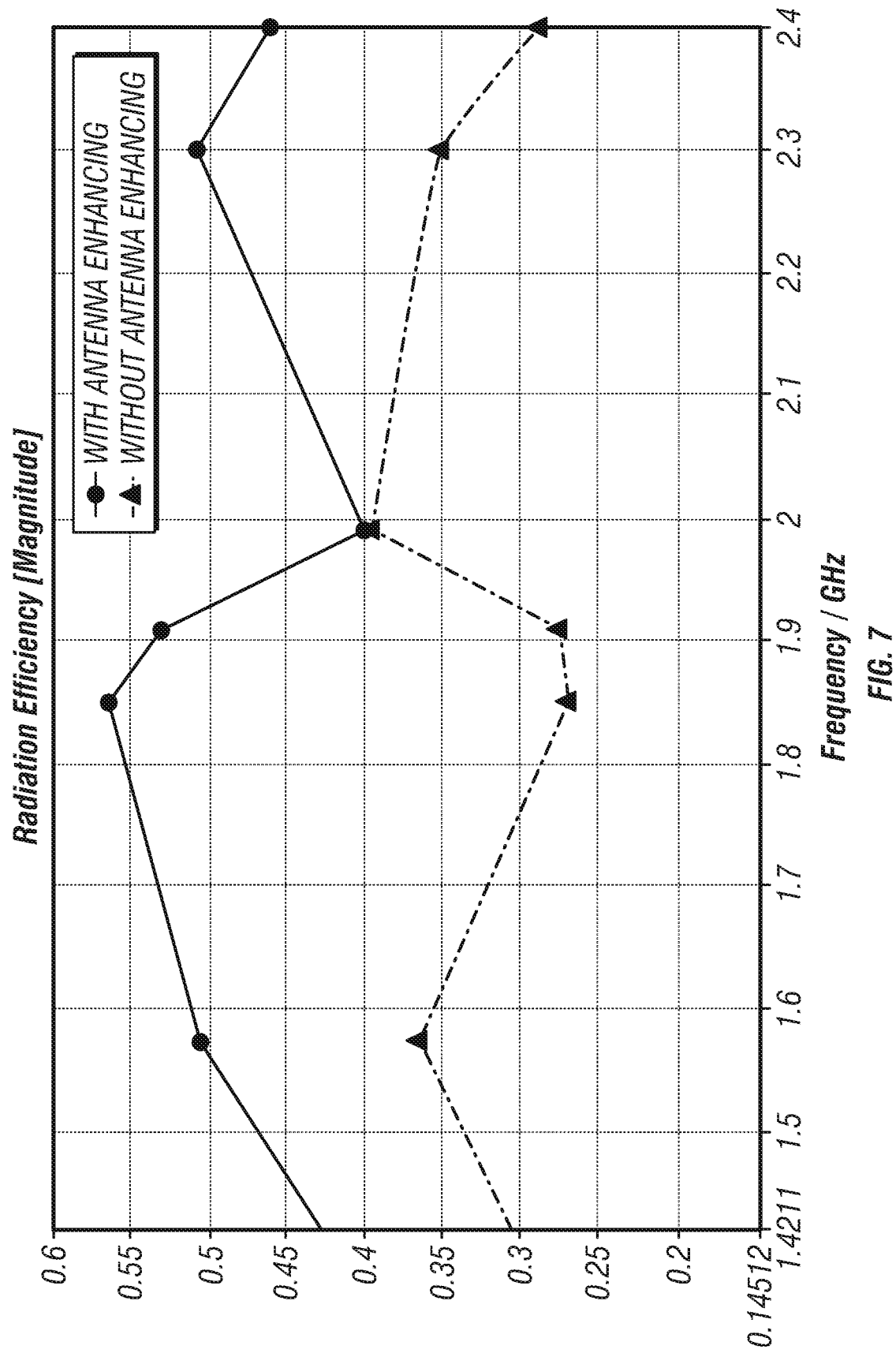
FIG. 7 is a graph that illustrates how the addition of an antenna enhancing structure results in increased performance of the antenna according to some embodiments of the present disclosure.

FIG. 7 is a graph that illustrates how the addition of an antenna enhancing structure between the antenna structure of a wireless device mounted on a holding structure and a surface material increases efficient. With the addition of the antenna enhancing structure, the antenna efficiency increased from 27% to 56%. This increase corresponds to the arrangement shown in FIG. 1, where the wireless device is a tracking device engaged on a holding structure and the mounting surface is the neck of an animal.

Processing System

Figure 8:
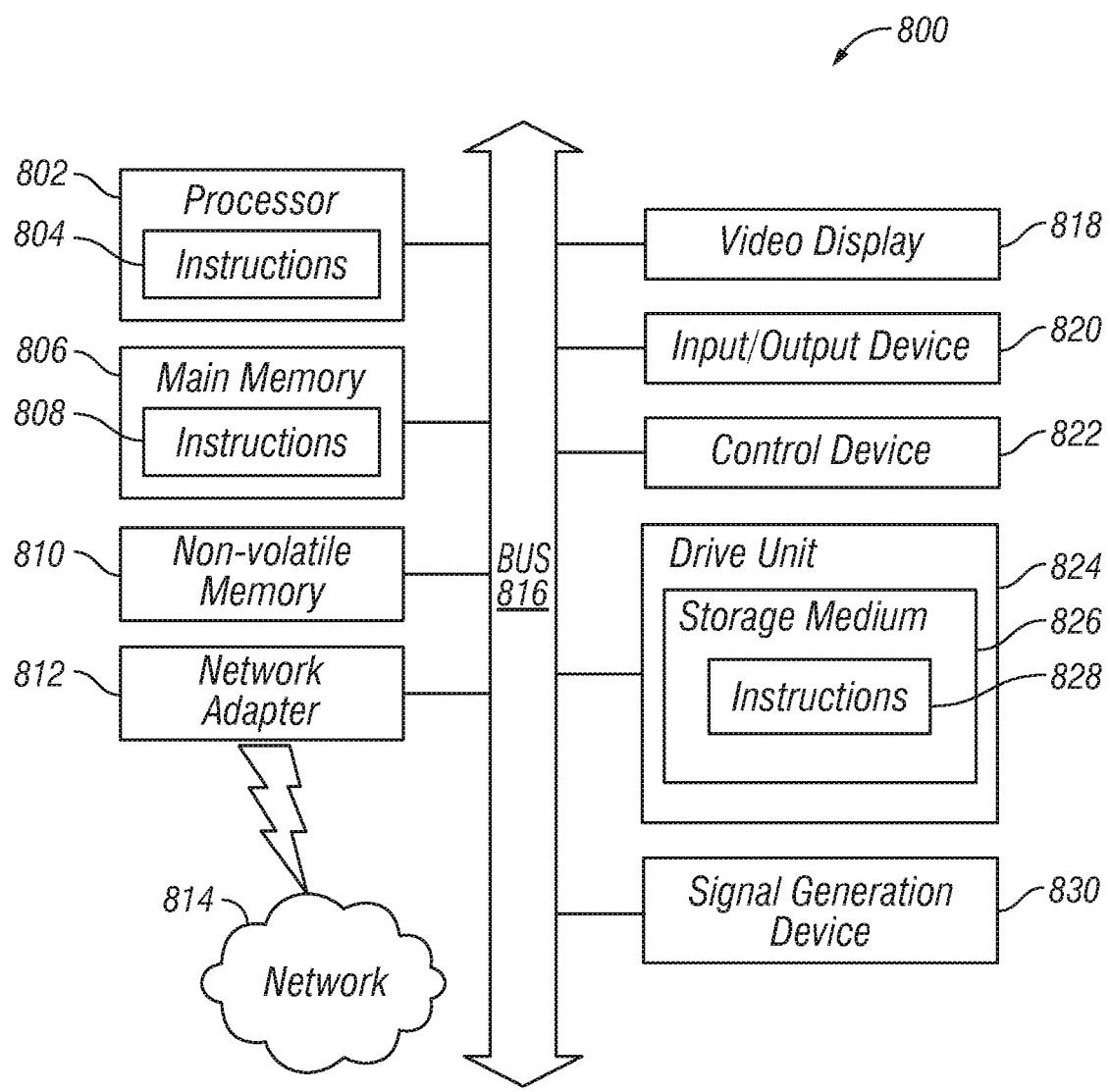
FIG. 8 is a block diagram illustrating an example of a processing system in which at least some operations described herein can be implemented.

FIG. 8 is a block diagram illustrating an example of a processing system 800 in which at least some operations described herein can be implemented. For example, some components of the processing system 800 may be hosted on a tracking device (e.g., tracking device 200 of FIG. 2A), a base device (e.g., base device 304 of FIG. 3A), or a network-accessible server system (e.g., network-accessible server system 306 of FIG. 3A).

The processing system 800 may include one or more central processing units ("processors") 802, main memory 806, non-volatile memory devices 810, network adapter 812 (e.g., network interface), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 800 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 800.

While the main memory 806, non-volatile memory devices 810, and storage medium 826 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 828. The term "machine-readable medium" and "storage medium" shall also be taken to include any medium that is capable of storing, encoding, or carrying a set of instructions for execution by the processing system 800.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in a computing device. When read and executed by the one or more processors 802, the instruction(s) cause the processing system 800 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 810, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 812 enables the processing system 800 to mediate data in a network 814 with an entity that is external to the processing system 800 through any communication protocol supported by the processing system 800 and the external entity. The network adapter 812 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A monitoring system comprising:
   a wireless device including:
      communications circuitry configured to enable wireless communications of data obtained locally by the wireless device; and
      an antenna coupled to the communications circuitry and configured to radiate signals including information indicative of the obtained data; and
   a holding structure including:
      an engagement member configured to detachably engage the wireless device;
      an attachment member configured to detachably attach the holding structure to a surface of an object monitored by the wireless device; and
      an antenna enhancing structure disposed inside the holding structure and configured to mitigate interference by the surface of the object on the signals radiated by the antenna.

2. The monitoring system of claim 1, wherein the antenna enhancing structure is a flat sheet of conductive material.

3. The monitoring system of claim 1 further comprising:
   a sensor configured to generate tracking data indicative of at least one of a location or motion of the object such that the obtained data is the tracking data of the object being tracked by the wireless device.

4. The monitoring system of claim 1, wherein the wireless device is an Internet-of-Things device and the antenna is configured to radiate the signals to a remote electronic device, the signals having a radio frequency less than 1 GHz.

5. The monitoring system of claim 1, wherein the wireless device comprises:
a battery power source housed in the wireless device.

6. The monitoring system of claim 1, wherein the antenna comprises:
a plurality of antenna element structures integrated in a plurality of walls of a housing of the wireless device.

7. The monitoring system of claim 1, wherein a surface of the holding structure configured for being in contact with the object is composed of a biocompatible material, and the antenna enhancing structure is a material different than the biocompatible material of the holding structure.

8. The monitoring system of claim 1, wherein the holding structure is composed of an electrically non-conductive material.

9. The monitoring system of claim 1, wherein the holding structure has an upper surface on which the wireless device is mounted, the upper surface has a surface area greater than a lower surface of the wireless device in contact with the upper surface, and the antenna enhancing structure is a non-conductive sheet with a total surface area facing the wireless device that is equal to or greater than the lower surface and less than the upper surface.

10. The monitoring system of claim 1, wherein the antenna enhancing structure is a flat metal sheet.

11. The monitoring system of claim 1, wherein the antenna enhancing structure is a sheet of electrically conductive material having (i) a first side configured to face the wireless device and (ii) a second side configured to face the object such that electromagnetic waves are isolated on the first side from the second side.

12. The monitoring system of claim 1, wherein the antenna enhancing structure is a flat metal sheet having a surface area of a side facing the wireless device being equal to or greater than a surface of a lower surface of the wireless device in contact with the holding structure.

13. The monitoring system of claim 1, wherein the antenna enhancing structure is a flat metal sheet having a surface that is sufficiently sized to increase a radiation efficiency by the antenna.

14. The monitoring system of claim 1, wherein holding structure lacks any electronics that require a power source to operate.

15. The monitoring system of claim 1, wherein the monitoring system is a wearable device.

16. The monitoring system of claim 1, wherein the wireless device is a health monitoring device configured to track health information, and the object is a human user whose health is monitored.

17. The monitoring system of claim 1, wherein the antenna enhancing structure is only disposed between the wireless device and the object.

18. The monitoring system of claim 1, wherein the antenna enhancing structure is sufficiently large to mitigate interference causing performance degradation to the antenna by the surface of the object.

19. The monitoring system of claim 1, wherein the wireless device is operable to automatically and autonomously communicate data about the object being monitored to a remote server over a wireless network.

20. A holding structure comprising:
one or more engagement members configured to detachably engage a battery-powered wireless device mounted on the holding structure;
an attachment member that enables attachment of the holding structure on a surface of an object; and
a flat conductive sheet embedded in the holding structure, the flat conductive sheet configured to enhance operations of an antenna of the battery-powered wireless device relative to the surface of the object.

21. The holding structure of claim 20, wherein the flat conductive sheet is configured to isolate electromagnetic waves radiated by the battery-powered wireless device from interference by the surface of the object.

22. A wearable tracking system comprising:
a tracking device including:
a sensor configured to estimate at least one of a location or movement of a human or animal user;
a processor configured to generate tracking data based on the estimated location or movement of the human or animal user;
a network interface including an antenna configured radiate signals over a wireless network to a remote electronic device, the signals having a radio frequency less than 1 GHz; and
a battery source configured to power the sensor, the processor, and the network interface; and
a holding structure configured to detachably engage the tracking device and detachably attach to a surface of the human or animal user, the holding structure comprising:
a flat metal sheet embedded in the holding structure, the flat metal sheet configured to mitigate interference of the radiated signals by the human or animal user.

* * * * *